United States Patent
Bates

(10) Patent No.: US 7,890,935 B2
(45) Date of Patent: Feb. 15, 2011

(54) THREAD-SPECIFIC PRESENTATION OF BREAKPOINTS

(75) Inventor: Cary L. Bates, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1295 days.

(21) Appl. No.: 11/421,095

(22) Filed: May 31, 2006

(65) Prior Publication Data

US 2007/0283330 A1 Dec. 6, 2007

(51) Int. Cl.
G06F 9/44 (2006.01)
(52) U.S. Cl. ...................................... 717/129
(58) Field of Classification Search ................. 717/116, 717/129, 109, 125; 714/38, 35; 705/317; 719/310, 312

See application file for complete search history.

(56) References Cited

U.S. PATENT DOCUMENTS

| 6,026,362 | A  | * | 2/2000 | Kim et al. .................... 705/317 |
| 7,331,002 | B2 | * | 2/2008 | Rivard et al. .................. 714/35 |
| 2003/0005415 | A1 | * | 1/2003 | Bates et al. ................. 717/129 |
| 2003/0106045 | A1 | * | 6/2003 | Arnold et al. ............... 717/129 |
| 2004/0006765 | A1 | * | 1/2004 | Goldman .................... 717/116 |
| 2004/0054944 | A1 | * | 3/2004 | Bates et al. ................... 714/38 |

* cited by examiner

Primary Examiner—Tuan Anh Vu
(74) Attorney, Agent, or Firm—Dillon & Yudell LLP

(57) ABSTRACT

A method, system and computer program product for performing thread-specific display of breakpoints are disclosed. The method includes, in response to determining that an event received from a user interface is a request to update a source code of a software module, updating a source display pane and determining whether a first breakpoint is capable of firing in a current thread. In response to determining that the first breakpoint is not capable of firing in the current thread, the first breakpoint is displayed in an altered display state to indicate that the first breakpoint cannot be hit in the current thread.

18 Claims, 4 Drawing Sheets

THREAD-SPECIFIC PRESENTATION OF BREAKPOINTS

BACKGROUND OF THE INVENTION

1. Technical Field

The present invention relates in general to verifying software and in particular to debugging. Still more particularly, the present invention relates to a system, method and computer program product for performing thread-specific display of breakpoints.

2. Description of the Related Art

With the increasing penetration of processor-based systems into every facet of human activity, demands have increased on the processor and communities to produce systems of hardware and software that are free from design flaws. Circuit products, including microprocessors, digital signal and other special-purpose processors, ASICs, and the software that runs them have become involved in the performance of a vast array of critical functions, and the involvement of computing systems in the important tasks of daily life has heightened the expectation of error-free and flaw-free design. Whether the impact of errors in design would be measured in human lives or in mere dollars and cents, consumers of computing systems have lost tolerance for results polluted by errors. Consumers will not tolerate, by way of example, miscalculations on the floor of the stock exchange, in the medical devices that support human life, or in the computers that control their automobiles. All of these activities represent areas where the need for reliable results has risen to a mission-critical concern.

In response to the increasing need for reliable, error-free designs, the processor and software design and development community has developed rigorous, if incredibly expensive, methods for testing and verification for demonstrating the correctness of a design. The task of hardware verification has become one of the most important and time-consuming aspects of the design process.

A debugger is a computer program that is used to debug (and sometimes test or optimize) other programs. The code to be examined might alternatively be running on an instruction set simulator (ISS), a technique that allows great power in its ability to halt when specific conditions are encountered but which will typically be much slower than executing the code directly on the appropriate processor.

When the program under test crashes, a source-level debugger or symbolic debugger, commonly seen in integrated development environments, shows the position in the original code. If it is a low-level debugger or a machine-language debugger, the debugger shows the line in the disassembly. A "crash" happens when the program can't continue because of a programming bug. For example, perhaps the program tried to use an instruction not available on the current version of the CPU or attempted access to unavailable or protected memory.

Typically, debuggers also offer more sophisticated functions such as running a program step by step (single-stepping), stopping (breaking), which includes pausing the program to examine the current state, at some kind of event by means of breakpoint, and tracking the values of some variables. Some debuggers have the ability to modify the state of the program while it is running, rather than merely to observe it.

The same functionality which makes a debugger useful for eliminating accidental bugs allows it to be used as a cracking tool to learn how to evade copy prevention and other programmed limitations. Debuggers make the debugging process much easier and faster, to the point where the availability of a good one for a particular language and platform can sway the decision to use that language rather than another language that is superior in other respects but lacks such tools.

An important difficulty is that software running under a debugger might behave differently than software running normally, because a debugger changes the internal timing of a software program. That makes it often very difficult to track down runtime problems in complex multi-threaded or distributed systems. As an answer to these difficulties, some graphical system debuggers allow a user to set breakpoints that fire only when the program hits the given breakpoint. On many debuggers these 'thread-specific' breakpoints are set by setting a normal breakpoint and then adjusting the breakpoint properties to apply only to the current thread.

While debuggers clearly track that a breakpoint is thread-specific, all prior art debuggers display the breakpoint along side the source without respect to the thread that the user is currently observing. This inability to select breakpoints in a thread specific manner leads to costly confusion in the debug process.

SUMMARY OF THE INVENTION

A method, system and computer program product for performing thread-specific display of breakpoints are disclosed. The method includes, in response to determining that an event received from a user interface is a request to update a source code of a software module, updating a source display pane and determining whether a first breakpoint is capable of firing in a current thread. In response to determining that the first breakpoint is not capable of firing in the current thread, the first breakpoint is displayed in an altered display state to indicate that the first breakpoint cannot be hit in the current thread.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

The present invention provides a method, system, and computer program product for performing thread-specific display of breakpoints. The present invention provides an optional filtering mode in which thread-specific breakpoints are not displayed unless they will fire in the thread currently being debugged. The thread currently being displayed is hereafter referred to as the 'current thread' (i.e. the current thread has either been selected by the user on a 'threads display' or was the thread in which a debug program stopped).

Figure 1:
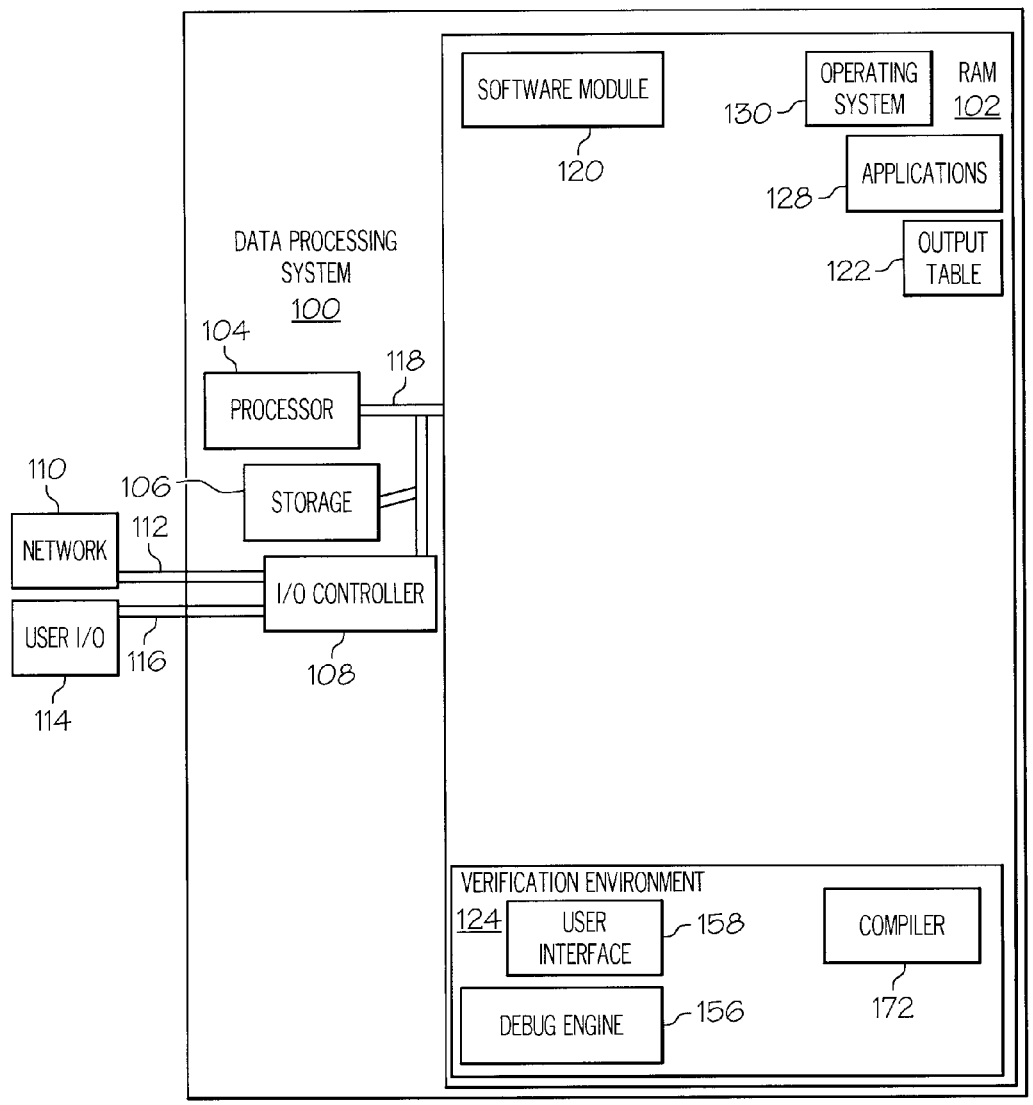
FIG. 1 depicts a block diagram of a general-purpose data processing system with which the present invention of a method, system and computer program product for performing thread-specific display of breakpoints may be performed.

With reference now to the figures, and in particular with reference to FIG. 1, a block diagram of a general-purpose data processing system, in accordance with a preferred embodiment of the present invention, is depicted. Data processing system 100 contains a processing storage unit (e.g., RAM 102) and a processor 104. Data processing system 100 also includes non-volatile storage 106 such as a hard disk drive or other direct-access storage device. An Input/Output (I/O) controller 108 provides connectivity to a network 110 through a wired or wireless link, such as a network cable 112. I/O controller 108 also connects to user I/O devices 114 such as a keyboard, a display device, a mouse, or a printer through wired or wireless link 116, such as cables or a radio-frequency connection. System interconnect 118 connects processor 104, RAM 102, storage 106, and I/O controller 108.

Within RAM 102, data processing system 100 stores several items of data and instructions while operating in accordance with a preferred embodiment of the present invention. These include a software module 120, which is under test, and an output table 122, for recording results of interaction with a verification environment 124. Other applications 128 and verification environment 124 interface with processor 104, RAM 102, I/O control 108, and storage 106 through operating system 130. Verification environment 124 contains a compiler module 172, a debug engine 156, and a user interface module 158. User interface module 158 allows for control of compiler module 172, which higher-level languages into machine-language executable code, which is then executed within debug engine 156.

Figure 2:
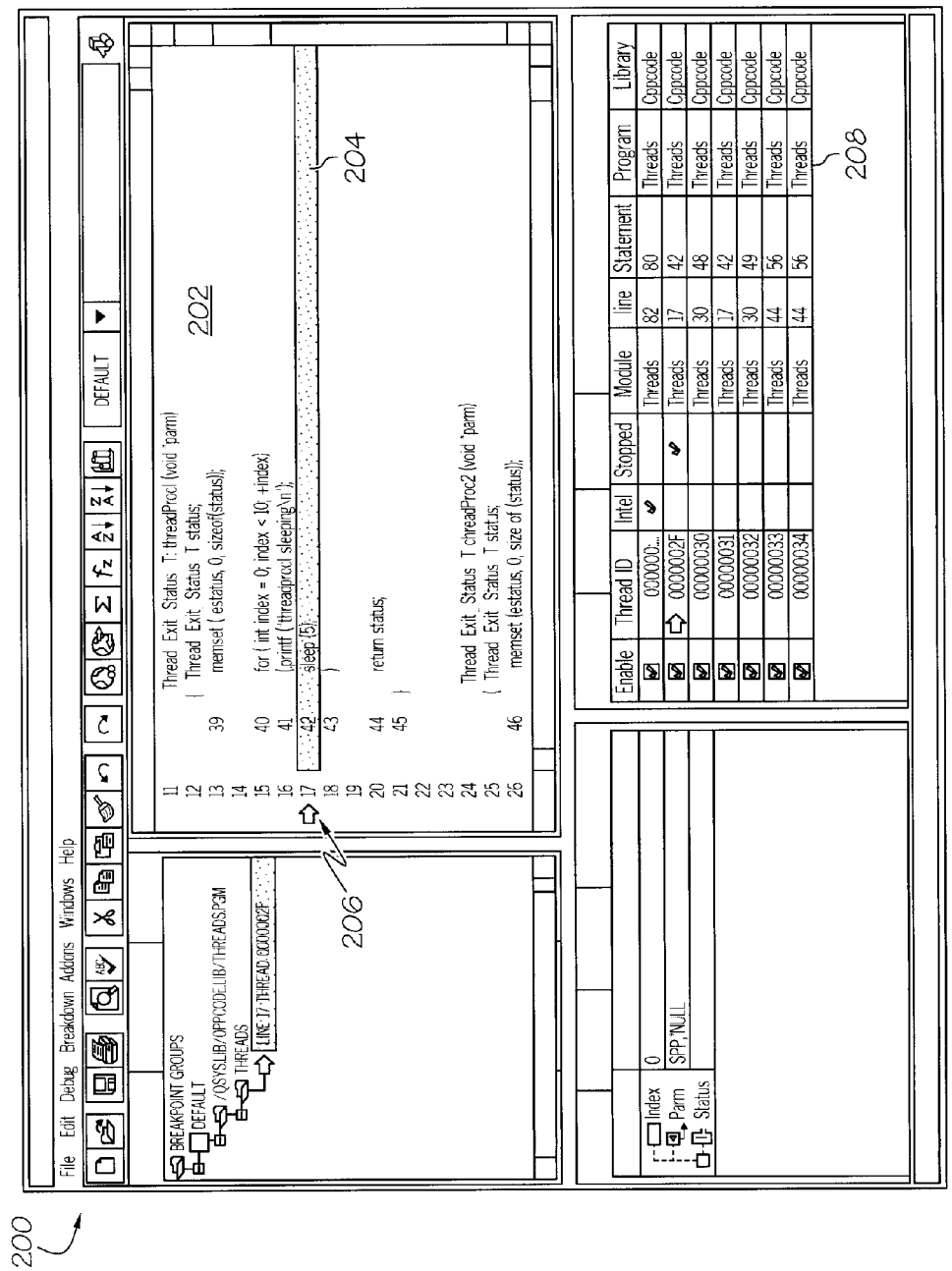
FIG. 2 is an exemplary debugger display in accordance with a preferred embodiment of the present invention.

Turning now to FIG. 2, an exemplary debugger display in accordance with a preferred embodiment of the present invention is illustrated. User interface module 158 creates a graphical user interface (GUI) 200 to allow a user to monitor and control the operations of compiler module 172 and debug engine 156. GUI 200 contains a source pane 202, which displays the higher-level code contained in software module 120. A stopped position indicator 204 indicates that compiler module 172 and simulator module 156 are stopped at a breakpoint, which is indicated by breakpoint indicator 206. A threads display 208 shows the different threads within software module 120.

Figure 3:
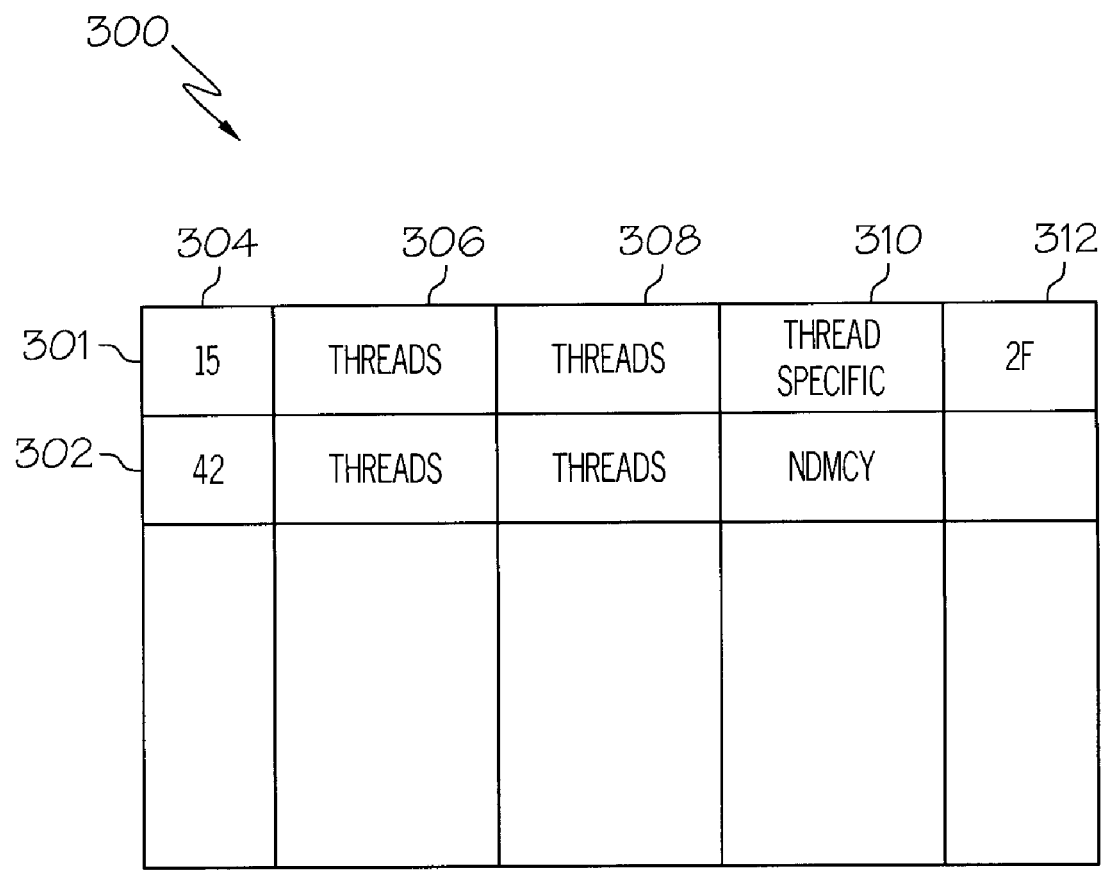
FIG. 3 is an exemplary thread-specific breakpoint table in accordance with a preferred embodiment of the present invention.

Referring now to FIG. 3, an exemplary breakpoint table in accordance with a preferred embodiment of the present invention is depicted. Thread-specific breakpoint table 300 is displayed within threads display 208. Within breakpoint table 300, a first line entry 301 and a second line entry 302 each contain 4 fields 304-312. First field 304 contains a line number for the breakpoint, which identifies the line of code from software module 120 in which the breakpoint represented by the line entry is contained. Second field 306 identifies the module containing the breakpoint represent by the line entry. Third field 308 indicates whether a specific program triggers the breakpoint. Fourth field 310 provides the type of breakpoint being used, and fifth field 312 indicates a thread ID for the breakpoint.

Figure 4:
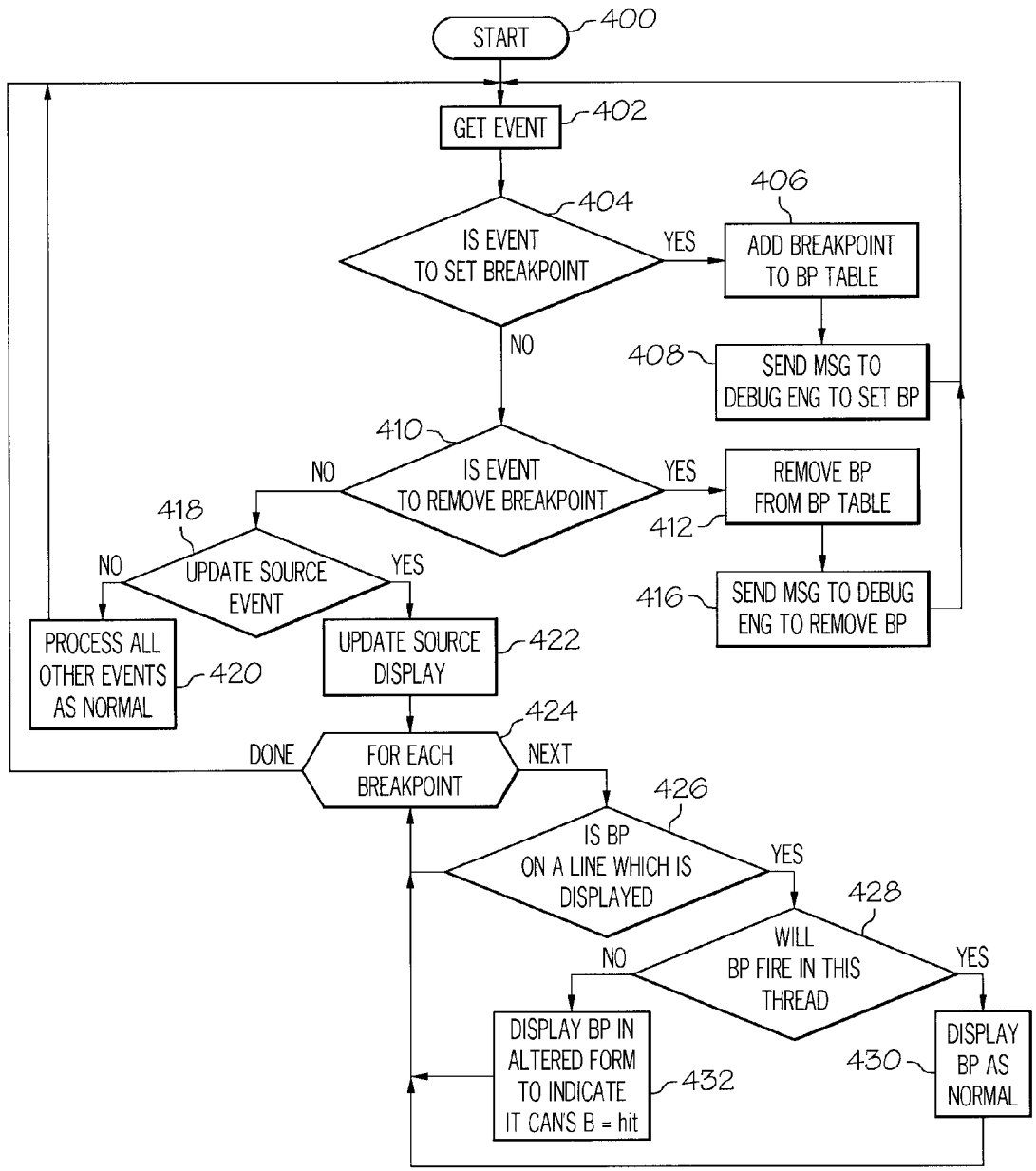
FIG. 4 is a high-level logical flowchart of a process for performing thread-specific display of breakpoints in accordance with a preferred embodiment of the present invention.

Turning now to FIG. 4, high-level logical flowchart of a process for performing thread-specific display of breakpoints in accordance with a preferred embodiment of the present invention is depicted. The process starts at step 400, and then moves to step 402 which depicts user interface module 158 receiving an event from user I/O 114. The process then moves to step 404. Step 404 illustrates verification environment 124 determining whether the event received by user interface module 158 in step 402 is a request to set a breakpoint. If verification environment 124 determines that the event received by user interface module 158 in step 402 is a request to set a breakpoint, then the process proceeds to step 406, which depicts verification environment 124 adding a breakpoint to breakpoint table 300. The process next moves to step 408. Step 408 illustrates verification environment 124 sending a message to debug engine to set a breakpoint in the software module 120. The process then returns to step 402, which is described above.

Returning to step 404, if verification environment 124 determines that the event received by user interface module 158 in step 402 is not a request to set a breakpoint, then the process proceeds to step 410, which depicts verification environment 124 determining whether the event received by user interface module 158 in step 402 is a request to delete a breakpoint. If verification environment 124 determines that the event received by user interface module 158 in step 402 is a request to delete a breakpoint, then the process proceeds to step 412, which depicts verification environment 124 removing a breakpoint from breakpoint table 300. The process next moves to step 416. Step 416 illustrates verification environment 124 sending a message to debug engine to remove a breakpoint from the software module 120. The process then returns to step 402, which is described above.

Returning to step 410, if verification environment 124 determines that the event received by user interface module 158 in step 402 is not a request to delete a breakpoint, then the process proceeds to step 418, which depicts verification environment 124 determining whether the event received by user interface module 158 in step 402 is a request to update source code of software module 120. If verification environment 124 determines that the event received by user interface module 158 in step 402 is not a request to update source code of software module 120, then the process next moves to step 420. Step 420 illustrates verification environment 124 processing performing event processing under normal procedures for verification environment 120. The process then returns to step 402, which is described above.

Returning to step 418, if verification environment 124 determines that the event received by user interface module 158 in step 402 is a request to update source code of software module 120, then the process proceeds to step 422, which depicts user interface module 158 updating source pane 202. The process next moves to step 424. Step 424 illustrates verification environment 124 setting a for/next loop to perform steps 426-432 for each breakpoint associated with software module 120 and queuing an unprocessed breakpoint for consideration. For each breakpoint associated with software module 120, the process next moves to step 426. Step 426 depicts user interface module 158 determining whether the current breakpoint is on a line that is displayed in source pane 202. If user interface module 158 determines that the current breakpoint is not on a line that is displayed in source pane 202, then the process returns to step 424, which is described above. However, if user interface module 158 determines that the current breakpoint is on a line that is displayed in source pane 202, then the process proceeds to step 428, which illustrates verification environment 124 determining whether the current breakpoint will fire in the current thread being executed. If verification environment 124 determines that the current breakpoint will fire in the current thread being executed, then the process next moves to step 430, which illustrates user interface module displaying the breakpoint in a normal manner (such as in a black font) to indicate that the current breakpoint can be hit from the current thread being executed. The process then returns to step 424, which is described above.

Returning to step 428, if verification environment 124 determines that the current breakpoint will not fire in the current thread being executed, then the process proceeds to step 432, which illustrates user interface module displaying the current breakpoint in an altered and reduced manner (such as in a gray font) to indicate that the current breakpoint cannot be hit from the current thread being executed. The process then returns to step 424, which is described above.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

What is claimed is:

1. A method for performing thread-specific display of breakpoints, said method comprising:
   presenting a graphical user interface of a verification environment, the user interface including a plurality of panes including a source display pane and a threads display pane;
   presenting source code of a software module undergoing execution by a debugger within the source display pane, the software module including a plurality of threads;
   presenting within the source display pane a visual breakpoint indicator indicating a location of a first breakpoint in the source code;
   presenting the plurality of threads of the software module in the threads display pane of the user interface;
   in response to selection via the threads display pane of a current thread among the plurality of threads, determining whether the first breakpoint can be reached by execution of the current thread; and
   performing thread-specific display of breakpoints by:
      in response to determining that said first breakpoint cannot be reached by execution of said current thread, graphically indicating in one of the plurality of panes other than the source display pane that said first breakpoint cannot be reached by execution of said current thread; and
      in response to determining that said first breakpoint can be reached by execution of said current thread, graphically indicating that the first breakpoint can be reached by execution of the current thread.

2. The method of claim 1, wherein said method further comprises:
   in response to receiving a request to set the first breakpoint, adding said first breakpoint to a breakpoint table presented within the graphical user interface and sending an adding message to said debugger to set said first breakpoint.

3. The method of claim 1, wherein said method further comprises:
   in response to receiving a request to remove said first breakpoint, removing said first breakpoint from a breakpoint table presented within the graphical user interface and sending a removal message to said debugger to remove said first breakpoint.

4. The method of claim 1, wherein said method further comprises:
   determining whether said first breakpoint is on a line that is displayed in said source display pane.

5. The method of claim 1, wherein:
   the method further comprises presenting a plurality of breakpoints including the first breakpoint in a breakpoint table;
   said graphically indicating in one of the plurality of panes other than the source display pane that said first breakpoint cannot be reached by execution of said current thread comprises graphically indicating said first breakpoint cannot be reached by execution of said current thread in the breakpoint table.

6. The method of claim 1, and further comprising graphically indicating in the source display pane a current line of source code undergoing execution by the debugger.

7. A data processing system for performing thread-specific display of breakpoints, said data processing system comprising:
   a processor; and
   data storage coupled to the processor that stores program code that, when executed by the processor, causes the data processing system to perform:
      presenting a graphical user interface of a verification environment, the user interface including a plurality of panes including a source display pane and a threads display pane;
      presenting a source code of a software module undergoing execution by a debugger within the source display pane, the software module including a plurality of threads;
      presenting within the source display pane a visual breakpoint indicator indicating a location of a first breakpoint in the source code;
      presenting the plurality of threads of the software module in the threads display pane of the user interface;
      in response to selection via the threads display pane of a current thread among the plurality of threads, determining whether the first breakpoint can be reached by execution of the current thread; and
      presenting thread-specific breakpoints by:
         in response to determining that said first breakpoint cannot be reached by execution of said current thread, graphically indicating in one of the plurality of panes other than the source display pane that said first breakpoint cannot be reached by execution of said current thread; and
         in response to determining that said first breakpoint can be reached by execution of said current thread, graphically indicating that the first breakpoint can be reached by execution of the current thread.

8. The data processing system of claim 7, wherein said program code further causes the data processing system to perform:
   in response to receiving a request to set the first breakpoint, adding said first breakpoint to a thread-specific breakpoint table presented within the graphical user interface and sending an adding message to said debugger to set said first breakpoint.

9. The data processing system of claim 7, wherein said program code further causes the data processing system to perform:
   in response to receiving a request to remove said first breakpoint, removing said first breakpoint from a thread-specific breakpoint table presented within the graphical user interface and sending a removal message to said debugger to remove said first breakpoint.

10. The data processing system of claim 7, wherein said program code further causes the data processing system to perform:
   determining whether said first breakpoint is on a line that is displayed in said source display pane.

11. The data processing system of claim 7, wherein:
   the program code further causes the data processing system to perform presenting a plurality of breakpoints including the first breakpoint in a breakpoint table;
   said graphically indicating in one of the plurality of panes other than the source display pane that said first breakpoint cannot be reached by execution of said current thread comprises graphically indicating said first breakpoint cannot be reached by execution of said current thread in the breakpoint table.

12. The data processing system of claim 7, wherein the program code further causes the data processing system to perform graphically indicating in the source display pane a current line of source code undergoing execution by the debugger.

13. A program product, comprising:
   a machine-readable storage medium storing a plurality of instructions processable by a machine, wherein said plurality of instructions, when processed by said machine, causes said machine to perform:
      presenting a graphical user interface of a verification environment, the user interface including a plurality of panes including a source display pane and a threads display pane;
      presenting a source code of a software module undergoing execution by a debugger within the source display pane, the software module including a plurality of threads;
      presenting within the source display pane a visual breakpoint indicator indicating a location of a first breakpoint in the source code;
      presenting the plurality of threads of the software module in the threads display pane of the user interface;
      in response to selection via the threads display pane of a current thread among the plurality of threads, determining whether the first breakpoint can be reached by execution of the current thread; and
      presenting thread-specific breakpoints by:
         in response to determining that said first breakpoint cannot be reached by execution of said current thread, graphically indicating in one of the plurality of panes other than the source display pane that said first breakpoint cannot be reached by execution of said current thread; and
         in response to determining that said first breakpoint can be reached by execution of said current thread, graphically indicating that the first breakpoint can be reached by execution of the current thread.

14. The program product of claim 13, wherein said plurality of instructions further cause the machine to perform:
   in response to receiving a request to set the first breakpoint, adding said first breakpoint to a thread-specific breakpoint table presented within the graphical user interface and sending an adding message to said debugger to set said first breakpoint.

15. The program product of claim 13, wherein said plurality of instructions further cause the machine to perform:
   in response to receiving a request to remove said first breakpoint, removing said first breakpoint from a thread-specific breakpoint table presented within the graphical user interface and sending a removal message to said debugger to remove said first breakpoint.

16. The program product of claim 13, wherein said plurality of instructions further cause the machine to perform:
   determining whether said first breakpoint is on a line that is displayed in said source display pane.

17. The program product of claim 13, wherein:
   the plurality of instructions further causes the machine to perform presenting a plurality of breakpoints including the first breakpoint in a breakpoint table;
   said graphically indicating in one of the plurality of panes other than the source display pane that said first breakpoint cannot be reached by execution of said current thread comprises graphically indicating said first breakpoint cannot be reached by execution of said current thread in the breakpoint table.

18. The program product of claim 13, wherein the plurality of instructions further causes the machine to perform graphically indicating in the source display pane a current line of source code undergoing execution by the debugger.

* * * * *